US006248815B1

(12) United States Patent
Papsin et al.

(10) Patent No.: US 6,248,815 B1
(45) Date of Patent: *Jun. 19, 2001

(54) DRY BOND FILM LAMINATE EMPLOYING ACRYLIC EMULSION ADHESIVES WITH IMPROVED CROSSLINKER

(75) Inventors: George A. Papsin, Lino Lakes; Thomas E. Rolando, Maple Grove; Peter A. Voss, St. Paul, all of MN (US)

(73) Assignee: H. B. Fuller Licensing & Financing, Inc., St. Paul, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/090,460

(22) Filed: Jun. 4, 1998

(51) Int. Cl.[7] .................................................. C08K 5/3412
(52) U.S. Cl. .......................... 524/86; 524/501; 524/507; 524/820; 524/823; 524/824; 524/827; 524/831; 524/832; 524/833; 524/839; 524/840; 525/374; 525/375
(58) Field of Search .............................. 524/86, 501, 507, 524/820, 823, 824, 827, 831, 832, 833, 839, 840; 525/374, 375

(56) References Cited

U.S. PATENT DOCUMENTS

| 4,318,833 | | 3/1982 | Guagliardo | 524/457 |
|---|---|---|---|---|
| 4,644,030 | | 2/1987 | Loewrigkeit et al. | 524/457 |
| 5,011,881 | | 4/1991 | Fujii et al. | 524/457 |
| 5,147,926 | | 9/1992 | Meichsner et al. | 524/591 |
| 5,281,655 | | 1/1994 | Mitsuji et al. | 524/507 |
| 5,608,000 | * | 3/1997 | Duan et al. | 524/591 |
| 5,624,758 | * | 4/1997 | Maksymkiw et al. | 428/423.1 |

* cited by examiner

Primary Examiner—D. S. Nakarani
(74) Attorney, Agent, or Firm—Nancy N. Quan

(57) ABSTRACT

The present invention relates to a water based laminating adhesive composition and a method of using thereof. More particularly, the invention relates to a water-based laminating adhesive comprising: a first component comprising at least one aqueous vinyl polymer dispersion (A) comprising the reaction product of i) at least one ethylenically unsaturated monomer; ii) at least one free radical initiator; and iii) optionally, at least one ethylenically unsaturated oligomer; and b) a second component comprising at least one water dispersible polyfunctional aziridine crosslinking agent (B). The adhesive optionally comprises at least one aqueous polyurethane polymer dispersion (C). Improved bonded properties of dry laminated flexible film substrates such as polyolefin, polyester and polyamide, as well as cellophane, metals or paper are obtained.

21 Claims, No Drawings

DRY BOND FILM LAMINATE EMPLOYING ACRYLIC EMULSION ADHESIVES WITH IMPROVED CROSSLINKER

FIELD OF INVENTION

The present invention generally relates to a water based laminating adhesive composition and a method of using thereof in adhesives for manufacturing laminate structures. More particularly, the invention is directed to a water based laminating adhesive composition comprising a first component comprising at least one aqueous water based vinyl polymer dispersion (A) comprising the reaction product of i) at least one ethylenically unsaturated monomer, ii) at least one free radical initiator, and iii) optionally, at least one ethylenically unsaturated oligomer; and a second component comprising at least one water dispersible polyfunctional aziridine crosslinking agent (B). The adhesive compositions optionally comprises at least one aqueous polyurethane polymer dispersion (C). Improved bonded properties of dry laminated flexible film substrates are obtained with the water based laminating adhesive composition.

BACKGROUND OF THE INVENTION

In general, the function of a laminating adhesive is to join together very fine films of different or similar substrates, e.g., polyethylene, polypropylene, polyester, polyamides, metal, paper or cellophane to form composite films used for many different purposes. A suitable laminating adhesive is expected to provide excellent bonds on numerous substrates with only a small application of adhesives.

Acrylic emulsions or dispersions are also used in commercial applications as adhesives or coatings and have been described in U.S. Pat. Nos. 4,558,092, 4,403,003, 4,322,328, 4,609,690, 4,522,973 and 4,525,510.

Guagliardo, U.S. Pat. No. 4,318,833 is directed to a coating composition comprising an ethylenically unsaturated monomer polymerized insitu in the presence of a water soluble polyurethane. Guagliardo does not employ acid, amine or hydroxy functional monomers in the acrylic monomer since it would react with or terminate the isocyanate prepolymer.

Aqueous linear or crosslinked aqueous polyurethane dispersions may be used in a wide range of commercial applications such as coatings and adhesives as shown in several patents including U.S. Pat. Nos. 5,147,926, 5,610,232, 5,637,639, 5,608,000 and 5,334,690.

Meichsner et al., U.S. Pat. No. 5,147,926 disclose crosslinkable aqueous polyurethane dispersion having long shelf life and containing polyurethanes which have carbonyl and polyhydrazides and their use for the preparation of printing inks.

Yasuhiro et al., U.S. Pat. No. 5,01,881 is directed to aqueous coating composition comprising aqueous acrylic resin and urethane resin emulsion in the absence of a crosslinking agent. The coatings are used for plastic substrates.

Mitsuji et al., U.S. Pat. No. 5,281,655 is directed to aqueous coating composition for metallic and plastic substrates. The composition comprising a urethane resin emulsion, a resin for use in aqueous coating composition and a hydrophobic melamine resin as a crosslinking agent. There is no disclosure regarding the use of the composition as a laminating adhesive.

Loewrigkeit et al., U.S. Pat. No. 4,644,030 discloses a process wherein isocyanate-terminated polyurethane dispersions are polymerized using a free radical initiator.

There remains a need for a water based laminating adhesive composition that exhibits excellent adhesion in a variety of film/film and film/foil, etc. lamination applications. The laminating adhesive composition overcomes the drawbacks of the prior art. Surprisingly, the laminating adhesive composition of the present invention provides improved adhesion, bond strength and resistance properties, as well as excellent processability and storage stability as compared to other laminating adhesive compositions.

SUMMARY OF THE INVENTION

The present invention is generally directed to a water based laminating adhesive composition and its use in adhesives for manufacturing laminate structures. In particular, the invention is to a water based laminating adhesive composition comprising:

a) a first component comprising at least one aqueous vinyl polymer dispersion (A) comprising the reaction product of:
  i) at least one ethylenically unsaturated monomer;
  ii) at least one free radical initiator; and
  iii) optionally, at least one ethylenically unsaturated oligomer; and
b) a second component comprising at least one water dispersible polyfunctional aziridine crosslinking agent (B).

Another aspect of the present invention is directed to a water based laminating adhesive composition comprising:

a) a first component comprising at least one aqueous vinyl polymer dispersion (A) comprising the reaction product of:
  i) at least one ethylenically unsaturated monomer;
  ii) at least one free radical initiator; and
  iii) optionally, at least one ethylenically unsaturated oligomer;
b) a second component comprising at least one water dispersible polyfunctional aziridine crosslinking agent (B); and
c) a third component comprising at least one aqueous polyurethane polymer dispersion (C) comprising:
  i) at least one polymeric polyol component having at least one carboxylic or sulfonic acid group neutralized with a counter cation selected from the group consisting of quaternary ammonium hydroxide, tetramethyl ammonium hydroxide, ammonium hydroxide, sodium hydroxide and organic amines;
  ii) at least one polymeric polyol selected from the group consisting of polyester polyol, polyether polyol, polyesterether polyol, and mixtures thereof; and
  iii) at least one polyisocyanate.

It has been discovered that improved bonded properties of dry laminated flexible film substrates, such as laminates comprising films of thermoplastics, such as polyolefin, polyesters and polyamides as well as paper, cellophane, and metals, particularly after exposure to heat and/or humidity are obtained with aqueous vinyl polymer dispersion wherein the bond strength is stabilized with a polyfunctional aziridine employed as the crosslinker of the adhesive system.

Another aspect of the present invention is a dry bonded laminate comprising a pair of flexible film substrates bonded with an adhesive, the laminating adhesive composition comprising an aqueous vinyl polymer, a crosslinker comprising a polyfunctional aziridine compound; and a polyurethane polymer having carboxylic or sulfonic acid groups thereon.

A further aspect of the invention is a curable adhesive prepared by blending the three components of the system at the time of use. The first component comprises at least one aqueous vinyl polymer dispersion (A) comprising the reaction product of i) at least one ethylenically unsaturated monomer; ii) at least one free radical initiator; and iii) optionally, at least one ethylenically unsaturated oligomer; and a second component comprising at least one water dispersible polyfunctional aziridine crosslinking agent (B). A third component comprising an aqueous polyurethane polymer dispersion, the polymer having a plurality of carboxylic or sulfonic acid groups which are neutralized with a counter cation selected from the group consisting of quaternary ammonium hydroxide, tetramethylammonium hydroxide, ammonium hydroxide, sodium hydroxide and organic amines.

A still further aspect of the invention comprises a method of manufacturing a dry bonded laminate comprising:
1) coating a first flexible substrate with a water based laminating adhesive composition comprising
   a) a first component comprising at least one aqueous vinyl polymer dispersion (A) comprising the reaction product of:
      i) at least one ethylenically unsaturated monomer;
      ii) at least one free radical initiator; and
      iii) optionally, at least one ethylenically unsaturated oligomer; and
   b) a second component comprising at least one water dispersible polyfunctional aziridine crosslinking agent (B); and
   c) optionally, an aqueous dispersion of polyurethane polymer having plural carboxylic or sulfonic acid groups thereon which are stabilized with a neutralizing agent;
2) drying the surface of the coated first flexible substrate with forced air and heat to form a dry coated substrate; and
3) applying onto the surface of the dry coated first flexible substrate a second flexible substrate using heat and pressure.

Another aspect of the present invention is directed to flexible packages and method of forming thereof Other aspects, objects, features and advantages of the present invention would be apparent to one of ordinary skill in the art from the following detailed description illustrating the preferred embodiments of the invention.

DETAILED DESCRIPTION OF THE INVENTION

The following glossary is provided as an aid to understand the use of certain terms herein. The explanations provided in the glossary are for illustrative purposes and do not limit the scope of the invention.

The term "ethylenically unsaturated monomer" include any compound containing acrylic groups (e.g., $\alpha$, $\beta$-unsaturated carbonyl), vinyl groups, allylic groups and acrylamide groups.

The term "active hydrogen atoms" refers to hydrogens which display activity according to the Zerewitinoff test as described by Kohlerin, J. Am. Chem. Soc., 49,3181 (1927).

The term "oligomer" is defined as a polymer comprising two or more covalently linked monomer units. Such oligomers may be hydrophilic or hydrophobic and comprise at least one ethylenically-unsaturated monomer including acrylic, vinyl, allylic, acrylamide and their mixtures.

The term "polyol" includes compounds having an average of two or more hydroxyl groups per molecule.

The term "(meth)acrylic" is used to encompass both acrylic and methacrylic resins.

The term "acid number" is defined as the number of milligrams of KOH required to neutralize all the acid groups in a 1 gram sample of the material. It is determined by titration per ASTM D-1639.

The term "hydroxyl number" indicates the extent to which a substance is acetylated. It is the number of milligrams KOH equivalent to free hydroxyl groups often as end groups present in 1 gram of polymer. The hydroxyl number is determined by acetylation of acetic anhydride and titration of excess anhydride with KOH.

At least one ethylenically-unsaturated monomer is used and may include monounsaturated monomers, polyunsaturated monomer and their mixtures.

Ethylenically-unsaturated oligomers can be used in combination with the ethylenically-unsaturated monomers. Examples of oligomers include the polyester-based acrylates and the polyurethane-based acrylates described in U.S. Pat. No. 4,822,829 (Muller et al.), U.S. Pat. No. 5,391,602 (Skoultchi) and U.S. Pat. No. 4,525,232 (Rooney et al.), incorporated herein by reference.

Any of the polymerizable known ethylenically unsaturated monomers can be used and compounds listed below are illustrative and are not restrictive of the monomers suitable for use in this invention. Ethylenically unsaturated monomers which may be used for the formation of the vinyl polymer are selected from the group consisting of:

a) Monoesters of acrylic acid or methacrylic acid with monohydric alcohol having 1 to 20 carbon atoms, e.g., Examples of said esters are methyl (meth)acrylate, ethyl (meth)acrylate, propyl (meth)acrylate, butyl (meth)acrylate, isobutyl (meth)acrylate, hexyl (meth) acrylate, 2-ethyl hexyl (meth)acrylate, isooctyl(meth) acrylate, isobornyl (meth)acrylate, isodecyl (meth) acrylate, nonyl (meth)acrylate, dodecyl (meth)acrylate, cyclohexyl(meth)acrylate, phenyl(meth)acrylate, benzyl(meth)acrylate, lauryl(meth)acrylate and the like; compounds having two or more polymerizable double bonds per molecule and prepared by reacting an acrylic or methacrylic acid with dihydric or polyhydric alcohol having 2 to 16 carbon atoms. Examples of such compounds being ethylene glycol di(meth)acrylate, 1,6-hexane di(meth)acrylate, trimethylolpropane di(meth)acrylate, allyl (meth)acrylate, trimethylol propane trim(meth)acrylate and the like; esters of fumaric or maleic acid with ethylenically-unsaturated alcohols, styrene, acrylonitrile, acrylamides, ethylenically-unsaturated imidazolidinones, ethylenically-unsaturated perfluorinated monomers, butanediol diacrylate, hexanediol diacrylate trimethylolpropane triacrylate. Other useful monomers include those described in U.S. Pat. No. 3,705,164 (Honig, et al.), incorporated herein by reference.

b) hydroxyalkyl acrylates, preferably, the monomer is a monoester of acrylic acid or methacrylic acid with a dihydric alcohol having 2 to 10 carbon atoms. Examples of such monoesters are hydroxyethyl (meth) acrylate, hydroxypropyl (meth)acrylate and the like. Commercially available polymers include Johncryl™ 587 from S. C. Johnson (Racine, Wis.);

c) vinyl substituted aromatic hydrocarbon such as styrene, $\alpha$-methyl styrene, vinyltoluene and the like;

d) substituted styrene such as chlorostyrene, p-vinylphenylphenyloxide, dichlorostyrene, bromostyrene and the like;

e) glycidyl containing vinyl monomers which are compounds having at least one glycidyl group and one polymerizable unsaturated bond in the molecule such as glycidyl (meth)acrylate, glycidyl and the like. Examples of commercially available glycidyl functional polyacrylic polymers include Fine Clad™ A-244A from Reichold Chemicals Inc. (Research Triangle, N.C.) and Almatex™ PD-7690 from Anderson Development Company (Adrian, Mich.);

f) nitrogen containing $C_{1-20}$ alkyl acrylates such as dimethylamino(meth)acrylate;

g) amide compounds having polymerizable unsaturated bond such as acrylamide, methacrylamide, di(meth)acrylamide, methoxymethylacrylamide, N,N-dimethylpropylacrylic amide, N-methylol(meth)acrylamide, diacetone(meth)acrylic amide and the like.

h) vinyl esters of aliphatic acids such as vinyl acetate, vinyl (meth)acrylate, vinyl propionate, vinyl chloride and the like. Other examples include higher vinyl esters of vinyl acetate such as Exxar™ neovinyl esters commercially available from Exxon.

i) nitrile compounds containing a polymerizable unsaturated bond such as acrylonitrile, methacrylonitrile, αchloroacrylonitrile and the like;

j) diene compounds such as butadiene and isoprene;

k) monoethylenically unsaturated sulfonates such as alkali metal salts of styrene sulfonic acids, 2-acrylamido-2-methyl propanesulfonic acid, 2-sulfoethyl(meth)acrylate, 3-sulfopropyl(meth)acrylate and the like;

l) vinyl ethers such as vinyl propyl ether, vinyl butyl ether and the like.

Ethylenically unsaturated monomers containing anionic and/or ionic groups can be used. Examples of such monomers include acrylic acid, methacrylic acid, fumaric acid, itaconic acid, crotonic acid, mesaconic acid, maleic acid, citraconic acid and/or their corresponding acids. Said monomers may be in the range of from about 0.1% by weight to about 25.0% by weight, preferably from about 0.1% by weight to about 10.0% by weight based on 100 parts total solids.

Monomers having active hydrogen atoms may be used in the present invention include hydroxyethyl acrylate, vinyl amine and the monomers described in U.S. Pat. No. 4,888,383 (Huybrechts), incorporated herein by reference. These monomers can be present in a range from about 0.1% by weight to about 10.0% by weight, and preferably from about 0.3% by weight to about 6.0% by weight, based on total polyvinyl solids.

The resulting polyvinyl polymer can have a weight-average molecular weight distribution of from about 2,000 grams per mole to about 1,000,000 grams per mole, and preferably from about 10,000 grams per mole to about 500,000 grams per mole. A weight-average molecular weight distribution less than about 500,000 grams per mole is often preferred when said materials are used for the preparation of adhesives having pressure sensitive characteristics. Generally, the preferred vinyl polymers are acrylates. Examples include acrylates as disclosed above. A preferred acrylate includes butyl acrylate and methyl methacrylate.

The vinyl polymer (A) is present in a range of from about 0.0% by weight ratio to about 100% by weight, preferably about 1% to about 99.5%, more preferably about 40% to about 99% and the crosslinking agent is present in a range of from about 0.5% by weight to about 20% by weight on polymer solids, more preferably about 0.5 to about 15% by weight, most preferably about 0.5 to 10% by weight.

The vinyl polymer (A) is prepared by any free radical initiated polymerization of at least one ethylenically unsaturated monomer or alternatively, with at least one other ethylenically unsaturated monomer. The emulsion polymerization of the monomers may be carried out according to known methods as provided in Say, U.S. Pat. No. 4,906,684, or for example by semi-batch process wherein a pre-emulsion of the above mentioned monomers is introduced into a reactor containing an aqueous solution of a free radical initiator and heated at a constant temperature of from 40° to about 100° C., preferably from about 50° to about 90° C.

The pre-emulsion of the monomers can be prepared by adding each monomer with stirring to an aqueous solution of an emulsifier, preferably an anionic emulsifier such as sodium sulfate, dodecylbenzensulfonate, dodecyldiphenyloxide-disulfonate, alkylphenoxypoly(ethyleneoxy) sulfates or dialkylsulfosuccinates wherein the alkyl radical has from 8 to 12 carbon atoms. Most preferably, a nonylphenoxypoly(ethyleneoxy)sulfate is used. It is to be understood that non-ionic emulsifiers may also be used.

The process usually requires the presence of a suitable catalyst or free radical initiator well known for use in polymerization of ethylenically unsaturated monomers which are soluble in the monomer. Examples include Vazo® 52 (2,2'-azobis[2,4-dimethylvaleronitrile]), Vazo® 64 (2,2'azobis [isobutylronitrile]), Vazo® 67 (2,2'-azobis [methylbutyronitrile]) and Vazo® 88 (1,1'-azobis (cyanocyclohexane) which are commercially available azonitrile compounds from DuPont (Wilmington, Del.). The grade number of these products indicate the Celsius temperature at which the azonitriles half-life in solution (toluene) is 10 hours. These initiators are readily soluble in the monomer mixture and can be heated to a temperature in a range from about 40° C. to about 100° C., and preferably from about 50° C. to about 90° C. Other initiators include peroxy compounds such as benzoyl peroxide and diisopropyl peroxydicarbonate. To some extent, the choice of initiator can influence the temperature at which polymerization is carried out and thus may constitute a further factor to be considered in deciding the overall composition of the polymerization mixture. Other conventional free radical initiators which may be used for the polymerization of the monomers are for example hydrogen peroxide, alkali metal persulfates, or ammonium persulfate. The free radical initiators can be added all at once, slowly over time or as a partial initial charge with the remainder being added slowly. The initiator may be present in an amount of from about 0.01% by weight to about 1.5% by weight, preferably from about 0.1% by weight to about 0.5% by weight based on 100 parts total solids. Also, oxidizing catalysts may be used independently or in combination with reducing agents such as sodium formaldehyde sulfoxylate, ferrous salts, sodium dithionite, sodium hydrogen sulfite, sodium sulfite and sodium thiosulfate. The redox catalysts may be present in an amount of from about 0.05% by weight to about 1.5% by weight and preferably from about 0.1% by weight to about 0. 5% by weight based on 100 parts total solids.

The dispersions are used in the invention with a water dispersible polyfunctional aziridine crosslinking agent (B) to produce the adhesive which is particularly suited for use as laminating adhesives for hot fill, boil in a bag and retortable packaging materials. Such adhesives of the invention comprise a mixture of polyurethane polymer dispersion, an aqueous vinyl polymer dispersion and a crosslinking agent which comprises a compound having plural aziridine or optionally in admixture with a compound having plural epoxy groups.

The term "aziridine" as used herein refers to alkyleneimine and "polyfunctional aziridine" includes a compound produced by polymerization of a compound having the following structure:

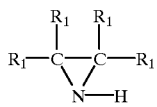

wherein $R_1$ is a hydrogen, an alkyl radical having 1 to 3 carbon atoms, phenyl or combinations thereof. Furthermore, polyfunctional aziridine include any compound having two or more of the following moiety:

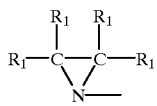

wherein $R_1$ is as described above. Such aziridines include ethyleneimine, ethylethyleneimine and propyleneimine. The aziridine compound of the present invention also include polyfunctional aziridines. Useful polyfunctional aziridines are compounds having two or more aziridinyl groups. They include but are not limited to 2-[3-(1-aziridinyl) propionyloxymethyl]1,3-bis[3-(2-methyl-1-aziridinyl) propionyloxymethyl]-2-ethylpropane (CAS64265-57-2). These materials are available commercially from Zeneca Resins, Inc. or prepared using known methods.

Examples of suitable plural aziridine compounds include trimethylolpropane-tris-(β-(N-aziridinyl)propionate), pentaerythritol-tris-(β-(N-aziridinyl)propionate) and 1-aziridinepropanoic acid, 2-methyl-, 2-ethyl-2[[3-(2-methyl-1-aziridinyl)-1-oxopropoxy]methy]-1,3-propanediyl ester. The two polyfunctional aziridine which are commercially available from Virginia Chemicals (Portsmouth, Va.) as XAMA-2 and XAMA-7 respectively. XAMA-2 has a solids content of 100% and aziridine content of 6.0 to 7.0 meg/g, an aziridine functionality of about 2.7, a density at 25° C. of 1.109 g/ml, a viscosity at 25° C. of 125–500 cps, a freezing point of less than −15° C., a vapor pressure of less than 0.1 mm and a solubility in water of 6.5 weight %. XAMA-7 has a solids content of 100% and aziridine content of 6.35 to 6.95 meg/g, an aziridine functionality of about 3.3, a density at 25° C. of 1.185 g/ml, a viscosity at 25° C. of 1200–2000 cps, a freezing point of less than −10° C. and is completely miscible in water.

The crosslinking agent (B) is added to the aqueous vinyl polymer dispersion (A) of the invention prior to the application of the mixture to the substrate. The crosslinking agent is present in an amount of about 0.5% to about 20% by weight based on the adhesives polymer solids content, preferably about 0.5% to about 10% by weight. Epoxy compounds when employed as co-crosslinking agents may be employed at a level of about 0.1% to about 10% by weight based on adhesive polymer solids, preferably about 0.5 to about 5%. Epoxy compounds can be any small molecular or polymeric compound or mixtures thereof having more than one epoxy group/molecule. Useful polyepoxies include glycidyl ethers of polyphenols such as bisphenol A or a polyol such as butanediol.

The aqueous polyurethane polymer dispersion (C) comprises i) at least one polymeric polyol component having at least one carboxylic or sulfonic acid group neutralized with a counter cation selected from the group consisting of quaternary ammonium hydroxide, tetramethylammonium hydroxide, ammonium hydroxide, sodium hydroxide and organic amines; ii) at least one polymeric polyol selected from the group consisting of polyester polyol, polyether polyol, polyesterether polyol, and mixtures thereof; and iii) at least one polyisocyanate.

Suitable compounds for incorporating the carboxylic or sulfonic groups are described in Duan et al., U.S. Pat. Nos. 5,608,000, 5,610,232 and 5,637,639, all assigned to H. B. Fuller Co., the disclosures of which are incorporated herein by reference. The preferred sulfonate groups for incorporation into the isocyanate terminated prepolymer are the diol sulfonic acids or diol sulfonates disclosed in U.S. Pat. No. 4,108,814.

Suitably, the prepolymer is left with a residual level (typically 2.0–3.0%) of isocyanate groups which can be reacted with chain extenders and chain terminators after dispersion so as to increase the molecular weight of the dispersed polymer and provide pendant reactive crosslinkable groups. The final polyurethane polymer is substantially free (<0.5%) of isocyanate groups.

Particularly preferred polyurethane polymer dispersions are prepared from aliphatic polyisocyanate which are characterized by median particle sizes of about 80 nm or less, typically about 30–80 nm, preferably about 70 nm or less. Median particle sizes are determined conventionally, for instance by the use of a BI-90 particle sizer sold by Brookhaven Instruments. The small particle size dispersion of the invention are almost clear and have improved application properties, especially using rotogravure application machinery.

In the preferred embodiments, the aliphatic isocyanate is a hindered isocyanate compound. The use of a hindered isocyanate helps prevent isocyanurate trimer formation during polymer manufacture and reduces the reactivity of residual isocyanate groups on the prepolymer. The hindered isocyanate can be any di-, tri- or polyfunctional isocyanate having tertiary aliphatic isocyanate functionality. Representative non-limiting examples of such isocyanates include m-tetramethylxylene diisocyanate and p-tetramethylxylene diisocyanate. Other polyisocyanate containing at least one sterically hindered group such as isophorone diisocyanate (IPDI) are usually employed in the preferred embodiments.

The plural isocyanate compound is reacted with polyol component providing acid functionality that will permit formation of stable dispersions in aqueous amine solution. The acid functional polyol component may comprise a polyol having at least two isocyanate reactive hydrogen and at least one acid functional group or a combination of polyol free of acid functionality having at least two isocyanate reactive hydrogens together with another compound having acid functionality and hydroxy, amine or thiol functionality.

Preferably, the polyhydroxy polymer compound or polyol used to make the prepolymer of the invention has a molecular weight of about 500 to about 3,000, preferably about 1,000 to about 2,000. Such polymers can be polyester condensation products of commercially available dicarboxylic acids and hydroxy compounds such as diols, triols, tetraols, etc. Additionally, such polymers can be polyether diols, triols, etc. based on polymers of ethylene oxide or propylene oxide.

The polyhydroxyl materials or polyols can be either low or high molecular weight materials and in general will have average hydroxyl values as determined by ASTM E 222-67, Method B, between about 1000 and 10 and preferably between about 500 and 50. The polyols include low molecular weight diols, triols and higher alcohols, low molecular weight amide containing polyols and higher polymeric polyol such as polyester polyol, polyether polyol and hydroxy containing acrylic interpolymer.

The polyol component of the prepolymer reaction may comprise an acid grafted polyether polyol such as polypropylene oxide grafted with for example, maleic or fumaric acid as taught in Frentzel, U.S. Pat. No. 4,460,738 or Knopf, U.S. Pat. No. 4,528,334 and are incorporated herein by reference. Other polyester polyol polyols produced from mixtures of di- and tri- or higher functional acid and polyol components in ratios which provide residual acid functionality as well as plural hydroxy groups may be employed.

Alternatively, polyol component comprises a mixture of a polyol free acid functionality and an acid functional compound having hydroxy, amine or thiol functionality. Suitable acid functional compounds include hydroxy and mercaptocarboxylic acids, aminocarboxylic acids, aminohydroxycarboxylic acids, hydroxysulfonic acids, aminosulfonic acids and aminohydroxysulfonic acids. Representative non-limiting examples of such acids include dimethylolpropionic acid, glycolic acid, thioglycolic acid, lactic acid, maleic acid, dihydroxymaleic acid, tartaric acid, dihydroxytartaric acid, 2,6-dihydroxybenzoic acid, oxaluric acid, anilidoacetic acid, glycine, α-alanine, 6-aminocaproic acid, the reaction products of ethanolamine and acrylic acid, hydroxyethylpropionic acid, 2-hydroxyethanesulfonic acid and sulphanilic acid.

Desirably, the polyurethane prepolymer has sufficient acid groups to provide an acid number of between about 10 and 30, preferably between about 14 and 16.

Where flexible and elastomeric properties are desired, the polyurethane prepolymer should preferably contain at least a portion of a higher molecular weight polymeric polyol, i.e., absence of trifunctional or higher functionality ingredients, to avoid any chance of gelling the resultant polymeric product and should have a hydroxyl number of about 200 or less, preferably within the range of about 150 to 30.

The most suitable polymeric polyol include polyalkylene ether polyol including thioethers, polyester polyols including polyhydroxypolyesteramides, and hydroxy containing polycaprolactones and hydroxy containing acrylic interpolymers.

Any suitable polyalkylene ether polyol may be used. Included are polyoxytetramethylene glycol, polyoxyethyleneglycol, polypropylene glycol and the reaction products of ethylene glycol with a mixture of propylene oxide and ethylene oxide.

Also useful are polyether polyols formed from the oxyalkylation of various polyols. For example, glycols such as ethylene glycol, 1,6 hexanediols, Bisphenol A and the like, higher polyols such as trimethylolpropane, trimethylethane, pentaerythritol and the like. Polyols of higher functionality which can be utilized as indicated can be made for instance by oxyalkylation of compounds such as sorbitol or sucrose. One commonly utilized oxyalkylation method is by reacting a polyol with an alkylene oxide, for example, ethylene or propylene oxide in the presence of acidic or basic catalyst.

Polyester polyol can be used as a polymeric polyol component in the practice of this invention. The polyester polyol can be prepared by polyesterification of organic polycarboxylic acid or anhydride thereof with organic polyols. Usually, the polycarboxylic acid and polyol are aliphatic or aromatic dibasic acids and diols. Suitable polyester polyols are sold by Ruco Corp. under Rucoflex® trademark including Rucoflex 1011, 1019, 108, 1015, 1035, 1040, 101, 102, 1037 and 1095.

The diols that are usually employed in making the polyester include alkylene glycols such as ethylene glycol and butylene glycol, neopentyl glycol and other glycols such as hydrogenated Bisphenol A, cyclohexanediol, cyclohexanedimethanol, caprolactone and ethylene glycol) hydroxyalkylated bisphenols, polyether glycols, for example poly(oxytetramethylene)glycol and the like. However, other diols of various types and as, indicated, polyols of higher functionality can also be utilized. Such higher polyols can also include for example trimethylolpropane, trimethylethane, pentaerythritol and the like as well as, higher molecular weight polyols such as those produced by oxyalkylating low molecular weight polyol is the reaction product of 20 moles of ethylene oxide per mole of trimethylol propane.

In a preferred embodiment, the polyfunctional polyol compound is reacted with hindered aliphatic polyfunctional isocyanate in the presence of a strong catalyst at a temperature of from about 40° to 140° C., more preferably from about 50° to 120° C. and from about 60° to 100° C. A representative non-limiting list of catalysts which may be used to drive this reaction include t-amines, organometallics such as dibutyltinlaurate, tin oleate, lead naphthanate, etc. Tin catalysts are preferred. The hindered isocyanate can be reacted with polyol at an isocyanate OH ratio of about greater than 1.1 moles of isocyanate per mole of OH and most preferably about 1.4 to 1.7 moles isocyanate per mole OH. When small molecule polyol with pendant acid functionality is used with acid free polyol, the acid component can be added at a rate of about 5 to 15 wt % of the polyol.

The polyurethane polymer is suitably stabilized in dispersion by neutralization of the acid functional groups on the polymer with an ammonia or an organic amine such as tertiary amine compound. Suitable tertiary amine compound has three aliphatic substituents. Such substituents can be $C_{1-15}$ alkyl groups which may be optionally cyclic aliphatic groups. The tertiary amine may also be cyclic aliphatic amine compound. Specific examples of tertiary amine include trimethylamine, triethylamine, tri-n-propyl amine, tri-n-butyl amine, N-methylpiperidine, N-ethylpiperidine, ethyldipropylamine, N-ethylpiperidine, N-methylpyrrolidone, ethyldipropylamine, etc. Neutralization can also be achieved using compounds such as quaternary ammonium hydroxide, tetramethyl ammonium hydroxide, ammonium hydroxide in its free form or ammonium hydroxide in an amount of at least about 0.5% by weight, preferably from about 1 to about 3% by weight. Ammonia or ammonium hydroxide is preferred as a neutralizing agent to provide improved storage stability to the composition. Ammonia is added until a pH within a range of about 7 to 10.5 is obtained.

In the preferred dispersions, when the acid number is between about 12 and 18, the amount of the neutralizing agent used in the prepolymer forming reaction should at least be sufficient to completely neutralize all the acid groups on the prepolymer. When the acid number of the prepolymer is greater than 18, the amount of neutralizing agent used in the prepolymer forming reaction should at least be sufficient to completely neutralize an equal amount of material having an acid number of 18. This is an amount substantially greater than would be used to simply catalyze a reaction of isocyanate and polyol groups.

In the formation of the preferred adhesive polymer dispersion for use in the invention, a preferred PU polymer can be manufactured by reacting di or tri isocyanate compound, an acid functional polyol, additional optional amounts of polyol free of acid functionality and amounts of chain extending agents and chain terminating agents that cooperate to control the molecular weight. Generally, it is desirable to utilize chain extending and terminating agents after the dispersion of the prepolymer in water. Suitable chain extenders are compounds having two or more amine groups more reactive to isocyanate than water. Suitable chain terminators are compounds having a single isocyanate reactive amine group.

The chain extending agent is added in a proportion that leaves less than 0.5 wt %, generally less than 0.1 wt %, preferably 0% of free reactive isocyanate. The chain termination agent is used in amount that controls molecular weight to about 1,500 to 10,000 and results in little free isocyanate, i.e., less than about 0.5 wt. %. Small molecule chain extending agents and small molecule chain terminating agents when used are preferably added at a rate of less than about 5 wt % of the dispersed polyurethane prepolymer. If high molecular weight agents are used, amounts should be adjusted accordingly.

The di-, tri-, etc. amines which can be employed in the preparation of the urethanes of the invention can be primary or secondary diamines or polyamines in which radicals attached to nitrogen atoms can be saturated or unsaturated, aliphatic, alicyclic, aromatic, aromatic substituted aliphatic, aliphatic substituted aromatic or heterocyclic. Mixed amines in which the radicals are different such as for example aromatic and aliphatic can be employed and other non-reactive groups can be present attached to the carbon atom such as oxo, sulfo, halo or nitroso. Aminoalcohols and aminophenols can be employed as chain terminators which leave a residual hydroxyl group available for subsequent crosslinking reactions. Representative nonlimiting examples include monoethanolamine and p-aminophenol.

The final dispersed polyurethane polymer used in the adhesives of the present invention is substantially free of reactive isocyanate groups, is typically hydroxy or amine terminated and usually has a substantial proportion of neutralized acid functional pendant groups which, in combination with the neutralizing agent cooperate to stabilize the polymer in aqueous dispersion.

The polyurethane polymer dispersion preferably has a solids content of from about 10 to about 80 wt %, preferably from about 20 to about 60 wt % and most preferably from about 30 to about 40 wt %. Further, the polymer dispersion has a low viscosity of from about 25 to 2,000 cps, preferably from about 50 to about 1,000 cps and most preferably from about 100 to 300 cps.

The polyurethane dispersion will remain storage stable and fully dispersed within the liquid vehicle for extended period of time. During storage, the level of particle separation or degree of particle dispersion is broken or particle clamping can interfere with the formation of an effective bond.

The water based laminating adhesive compositions can be prepared by blending together at least one aqueous vinyl polymer dispersion comprising the reaction product of at least one ethylenically-unsaturated monomer; at least one thermally activated free-radical initiator to form a reactive mixture; optionally at least one ethylenically unsaturated oligomer; and at least one water dispersible polyfunctional aziridine crosslinking agent to form a reactive mixture. The mixture is agitated in an oxygen-free environment and heated to form a polyvinyl polymer.

The polyurethane polymer is present in a range of from about 0.0% by weight ratio to about 100.0% by weight, more preferably from about 0.1 to about 99%, most preferably 40% to about 99%. The compositions can have viscosities in a range of from about 10 to about 5000 cps, more preferably about 20 to about 1000 cps, most preferably about 30 to about 200 cps at a temperature of about 77° F. (25° C.).

To prepare the water based composition in accordance with the present invention, the aqueous vinyl polymer dispersion (A), the water dispersible polyfunctional aziridine crosslinking agent and the aqueous polyurethane polymer dispersion (C) mentioned hereinabove are mixed homogeneously at a temperature in a range of from about 25° C. to about 95° C., preferably from about 45° to about 75° C., by any suitable mixing apparatus.

If desired, water soluble compounds containing primary and/or secondary amines may be reacted with the polymer dispersion mixture of the invention. Suitable examples include monoethanolamine, ethylenediamine, diethylenetriamine and ammonia.

If desired, the water based composition of the present invention may include other auxiliary substances which may be added to the final composition in relative amounts in order to impart desirable properties or to suppress undesirable properties. Examples of such substances include fillers, plasticizers, pigments, dispersing agents for pigments, dyes, perfume-like materials, wetting agents, heat stabilizers, carbon black, silica sols, leveling agents, antifoaming agents, organometallic catalysts, tertiary amine catalysts, surfactants, defoaming agents, coalescing agents, fungicides, bactericides, thickening agents, UV-stabilizers, fire retardants and organic solvents and the like. Such materials can be introduced at any stage of the production process.

The composition may also be blended with other polymer dispersion such as polyvinyl acetate, epoxy resins, polyethylene, polystyrene, polybutadiene, polyvinyl chloride, polyacrylate and other homopolymer and copolymer dispersions.

The inventive compositions and products therefrom can be used as adhesives, binders, coatings, primers and can be applied to substrates including wood, fabric, paper, fiberboard, cardboard, leather, metal, glass, glassfibers, cloth, natural rubber, ceramics, synthetic polymers including acrylonitrile-butadiene styrene (ABS), polyvinyl chloride and polypropylene. The compositions may be applied on a substrate using application methods such as brushing, roll coating, spraying, or by engraving cylinders and the like.

Application of Adhesive

Application may be performed by spraying, roll coating, the use of doctor blades, brushing or dipping. For flexible film substrates, roll coating suitably by rotogravure is preferred. The adhesive can be applied to a wide variety of substrates including non-polar thermoplastics, for example polyolefin (polypropylene, polyethylene in various forms such as low density polyethylene (LDPE) oriented polypropylene (OPP) and linear low density polypropylene (LLDP); polyesters such as polyethylene terephthalate (PET), metal films, nylon, paper, cellophane, metallized polyester, etc. and is especially suitable for preparation of flexible retortable packaging laminate materials.

The adhesives of the present invention may be coated onto flexible substrates using conventional coating units. A suitable unit includes the geometric C/L-400 coater/laminator from Geometric Machines (Edison, N.J.). The laminating process typically involves roll coating the adhesive using a gravure cylinder, onto a first flexible substrate at an application rate of 0.25 grams/meter$^2$ to about 10.0 grams/meter$^2$, based on solids. After the adhesive has been applied, it was dried at a temperature of about 25° C.–200° C. (77° F.–392° F.) using methods known in the art, i.e., circulating ovens, gas impingement drier, infrared radiation, heat lamps. The dry coated substrate is then mated with a second flexible substrate or web, which may be the same or different from the first substrate with application of heat or pressure.

For typical flexible film laminate materials, application is at a rate of about 0.51 to about 10.2 grams adhesive solids /meter$^2$ (about 0.3 to about 6.0 lbs/3000 ft$^2$), preferably, about 1.7 to about 3.4 grams/meter$^2$ (about 1.0 to about 2.0 lbs/3000 ft$^2$) will generally provide satisfactory results.

After the adhesive dispersion has been applied to the first substrate, it is dried to form an adhesive film on the surface of the substrate, Any method known to those skilled in the art may be used to dry the adhesive including conventional ovens, circulating ovens, infrared radiations, heat lamps as well as flash drying the adhesive on the substrate surface.

It may be desirable to laminate one film having excellent moisture vapor barrier properties to another film having excellent strength characteristics. The choice of substrates would therefore be up to the skilled practitioner in the art to achieve a laminate of particular desired properties for the user.

The use of heat and pressure to apply the second substrate facilitates bonding and crosslinking. Typically, a film coating and laminating apparatus will run at a rate of 100–600 linear feet of film per minute will use a drying oven 10–25 feet (3-7.6 meters) long at 120° F. to about 130° F. (49° C. to about 54° C.) and will apply the second film substrate to the dried adhesive at a nip pressure of about 20 to about 60 psi and a temperature of about 110° to about 220° F. (43° C. to about 104° C.). Other application such as drying and curing temperature can be readily employed by those skilled in the art.

The peel adhesion is measured by a 180° test which is known in the art, mainly the Pressure Sensitive Adhesive Tape Council-1 (PSTC-1). The cohesive strength was measured by PSTC-7. The humidity test is performed by placing the laminates in an oven at 65.5° C.

Humidity Resistance Test

The Humidity Resistance Test is performed by exposing a 4"×4" pouch made from the bonded laminates to 100% relative humidity at 25° C. The laminates, e.g., polypropylene to polypropylene and PET/polyethylene were prepared using a geometric C/L-400 coater laminator unit run at a rate of 91.4 meters/min (300 ft/min). The adhesives were coated onto PET substrate using a rotogravure set at a level of 453.6 grams solid material per 91.4 meters$^2$ (1.0 lbs./3000 ft$^2$). The coated substrate was then passed through a 4.57 meter (15 foot) drying oven, set at a temperature of 65.5° C. and then mated with aluminum foil using a nip temperature of 65.5° C. and a nip pressure of 2.8 kgs/sq. cm. (40 psi). The bonded laminates were used to prepare 10.16 cm. by 10.16 cm. pouches. The laminate was allowed to cure for three days before the pouch was made. The pouch was filled with water and placed in a test chamber at ambient room temperature having 100% relative humidity. After one day and six days, the laminates were visually inspected for signs of delamination or tunneling. The laminates "pass" the humidity test if no visible signs of delamination or tunneling are detected.

Storage Stability

The storage stability of the water based adhesive composition is determined by checking 250 g samples in white, air tight plastic containers every two weeks.

All of the cited patents and publications are incorporated herein by reference. The following specific examples are provided to better assist the reader in the various aspects of practicing the present invention. As these specific examples are merely illustrative, nothing in the following descriptions should be construed as limiting the invention in any way.

EXAMPLES

Example 1

Preparation of Aqueous Vinyl Polymer

Into a four neck flask were added one gram of surfactant and 410 g deionized water and stirring was initiated. The mixture was heated at 85° C. and 2 g polymerization initiator was added. Separately, 350 g of methyl methacrylate from ICI Americas, Inc. (Wilmington, Del.) and butyl methacrylate from Hoechst Celanese Corp. (Somerville, N.J.), 10 g surfactant and 210 g deionized water were agitated to prepare the monomer emulsion. The monomer emulsion was transferred into the flask and reacted at a temperature of 85° C. The reaction was maintained for 3 hours. The reaction was cooled and pH was adjusted to obtain an aqueous dispersion of vinyl polymer having a viscosity of 50 cps.

A two part adhesive foundation was prepared. The first part being the aqueous vinyl polymer dispersion described above and the second part being plural aziridine compound 1-aziridine propanoic acid, 2-methyl-, 2-ethyl-2[[3-(2-methyl-1-aziridinyl)-1-oxopropoxy]methyl]1,3-propanediyl ester. The weight blend ratio, solids basis was 98:2.

Example 2

Preparation of Polyurethane Dispersion

Into a three neck flask equipped with a thermometer, inert gas source and mechanical stirrer was placed 16.3 grams of poly(propyleneoxide)diol (Voranol™220-110, Dow Chemical, 3.9 grams of adipic/hexanediol/isophthalic acid polyester diol (Rucoflex™1019-35), 1.2 grams of dimethylpropionic acid, 8.1 grams of tetramethylxylenediioscyanate (TMXDI) and 0.01 grams dibutyltindilaurate were added and the mixture heated at 93.33° C. (200° F.) and held for approximately 3.5 hours until NCO content of 2.0% was achieved. The resulting polyurethane prepolymer was then added to 68 grams of water to which was added 0.9 grams of ammonia (equivalent to 100% neutralization) with vigorous stirring. After all the prepolymer was added, a mixture of 2 grams of water 0.3 grams ethylenediamine and 0.15 grams of ethanolamine were added to the dispersion. The resulting dispersion contains 30% solids and a pH of 8.0. Other properties are as follows:

Acid Number 16.5

Median particle size 70 nm

Appearance clear

Shelf life stability greater than 3 months

Example 3

Preparation of Polyurethane

Into a three neck flask equipped with a thermometer, inert gas source and mechanical stirrer was placed 13.3 grams of polyether triol (Voranol™230-112 Dow Chemical) and 1.3 grams of phthalic anhydride. The contents were heated to 154.4–160° C. (310–320° F.) and held approximately 1 hour until an acid number of 34±1 was achieved. The resulting acid functional polyester polyol was cooled at 65.56° C. (150° F.) and 14 grams of an adipic/isophthalic/hexanediol polyester (Rucoflex™ 1019-55), 5.7 grams of IPDI (Huls) were added and the mixture heated at 170° F. and held for approximately 1 hour until NCO content of 2.4% was achieved. The prepolymer was then added to 62.1 grams of water to which was added 0.9 grams of ammonia, with vigorous agitation. After all the prepolymer was added, a mixture of 2 grams water, 0.4 grams of ethylenediamine and 0.3 grams of ethanolamine was added to the dispersion. The resulting dispersion contained 35% solids and a pH of 7.5. The median particle size was 70 nm. The acid number of the prepolymer was 135.

A three part adhesive was prepared, the first part being the vinyl polymer dispersion as described above, the second part being the plural aziridine compound and the third part is polyurethane dispersion as described above. The weight blend ratio, solids basis was 49:49:2.

A comparative example was conducted using a different crosslinking agent such as water dispersible polyisocyanate. It was demonstrated that the addition of 2.5% of the polyfunctional aziridine to the vinyl polymer dispersion increased the bond strengths and resistance properties. The adhesive can also be employed in more difficult applications. In addition, the potlife of the adhesive system is 8–12 hours and is much longer than other crosslinkers such as water dispersible polyisocyanates.

Laminates of PET film to aluminum metal foil and polypropylene were conducted using a coating and laminating machine running at a rate of 91.4 meter/min. (300 ft/min.), applying the blended adhesive to a PET film substrate by rotogravure at a level of 1.7 grams/meter$^2$ (1.0 1lb/3000 ft$^2$), solids basis passing the adhesive coated film through a 15 foot drying oven at a temperature of 65.56° C. (150° F.) and a pressure of 40 psi. The laminates were cured at ambient temperature for three days before testing. Tests were performed on 1 inch test strips. The test strips were then tested for 180° peel at a rate of 12 inches/min. Test results averages of several samples are shown in the Table I.

TABLE I

FILM LAMINATING PERFORMANCE

|  | Peel Strength (grams) | | Resistance Properties | | | |
| --- | --- | --- | --- | --- | --- | --- |
|  | | | PET/PE | | PP/PP | |
|  | | | 100% | | 100% | |
| Adhesive | PET/Foil | PET/PP | humidity | Ambient | humidity | Ambient |
| vinyl/aziridine | 300 | 600 | Pass* | Pass | Pass | Pass |
| vinyl/aziridine/ PUD | 450 | Film destruct | Pass | Pass | Pass | Pass |
| Comparative Example | 225 | 400 | Fail | Pass | Fail | Pass |

*Slight failure

The above examples have been depicted solely for the purpose of exemplification and are not intended to restrict the scope or embodiments of the invention. The invention is further illustrated with reference to the claims that follow thereto.

What is claimed is:

1. A water-based laminating adhesive consisting essentially of:
   a) a first component comprising at least one aqueous vinyl polymer dispersion (A) comprising the reaction product of:
      i) at least one ethylenically unsaturated monomer;
      ii) at least one free radical initiator; and
      iii) optionally, at least one ethylenically unsaturated oligomer; and
   b) a second component comprising at least one water dispersible polyfunctional aziridine crosslinking agent (B).

2. The adhesive according to claim 1 wherein the monomer is selected from the group consisting of acrylic, methacrylic, vinyl, allylic, acrylamide and mixtures thereof.

3. The adhesive according to claim 1 wherein the ethylenically unsaturated monomer (A)(i) is selected from the group consisting of at least one monomer in the form of an acid, ester, amide, or substituted derivative thereof selected from the group consisting of acrylic monomers, methacrylic monomers, acrylamide, acrylate monomers, methacrylate monomers and mixtures thereof; and at least one monomer selected from the group consisting of styrene, α-methyl styrene, α-olefin monomers, vinyl monomers and allylic monomers and mixtures thereof.

4. The adhesive according to claim 3 wherein said monomer (A)(i) is an acrylate selected from $C_1$–$C_{20}$ alkyl (meth)acrylates.

5. The adhesive according to claim 4, wherein the (meth)acrylates are selected from the group consisting of ethyl (meth)acrylate, methyl (meth)acrylate, propyl (meth)acrylate, butyl (meth)acrylate, isobornyl (meth)acrylate, isooctyl (meth)acrylate, 2-ethyl hexyl (meth)acrylate, isobutyl (meth)acrylate, isodecyl (meth)acrylate, lauryl (meth)acrylate, stearyl (meth)acrylate, hexyl (meth)acrylate and mixtures thereof.

6. The adhesive according to claim 1 wherein the monomer comprises an active hydrogen atom.

7. The adhesive according to claim 6 wherein the monomer is selected from the group consisting of hydroxyethyl acrylate, vinyl amine and mixtures thereof.

8. The adhesive according to claim 1 wherein the initiator is selected from the group consisting of 2,2'-azobis(2,4-dimethylvaleronitrile), 2,2'-azobis(isobutylnitrile, 2,2'-azobis(methylbutyronitrile), 1,1'-azobis(cyanocyclohexane) and mixtures thereof.

9. The adhesive according to claim 1 wherein the oligomer is based upon a monomer selected from the group consisting of acrylic, methacrylic, vinyl, allylic, acrylamide and mixtures thereof.

10. The adhesive according to claim 1 wherein the adhesive has a solid content in a range of from about 30% by weight to about 70% by weight.

11. The adhesive according to claim 1 wherein the adhesive has a viscosity of from about 10 to about 5000 cps at a temperature of about 77° F.

12. The adhesive according to claim 1 wherein the crosslinking agent is preseot in a range of from about 0.5% by weight to about 20% by weight on polymer solids.

13. The adhesive according to claim 1 wherein after drying and curing, the adhesive is present at a level of between about 0.3 and about 6.0 lbs/3000 ft$^2$.

14. A water-based laminating adhesive consisting essentially of:
   a) a first component comprising at least one aqueous vinyl polymer dispersion (A) comprising the reaction product of:
      I) at least one ethylenically unsaturated monomer;
      II) at least one free radical initiator; and
      III) optionally, at least one ethylenically unsaturated oligomer; and
   b) a second component comprising at least one water dispersible polyfunctional aziridine crosslinking agent (B); and
   c) at least one aqueous polyurethane polymer dispersion (C) comprising:
      i) at least one polymeric polyol component having at least one carboxylic acid group neutralized with a counter cation selected from the group consisting of quaternary ammonium hydroxide, tetramethylammonium hydroxide, ammonium hydroxide, sodium hydroxide and organic amines;
      ii) at least one polymeric polyol selected from the group consisting of polyester polyol, polyether polyol, polyesterether polyol, and mixtures thereof; and
      iii) at least one polyisocyanate.

15. The adhesive according to claim 14 wherein the polyisocyanate is selected from the group consisting of linear aliphatic polyisocyanate, cyclic aliphatic polyisocyanate, aromatic polyisocyanate and mixtures thereof.

16. The adhesive according to claim 14, wherein said polyurethane further comprising at least one monoamine chain terminator and at least one polyamine chain extender.

17. The adhesive according to claim 14 wherein the polyurethane polymer is present in a range of from about 40% by weight to about 99% by weight.

18. A water-based laminating adhesive comprising:
   a) a first component comprising at least one aqueous vinyl polymer (A) wherein said vinyl polymer in the presence of at least one free radical initiator, is a reaction product of reactants selected from the group consisting of:
      i) at least one ethylenically unsaturated monomer or mixtures thereof;
      ii) a combination of at least one catholically unsaturated monomer and at least one ethylenically unsaturated oligomer; and
      iii) at least one ethylenically unsaturated oligomer; and
   b) a second component comprising at least one water dispersible polyfunctional aziridine crosslinking agent (B), wherein said adhesive exhibits humidity resistance after being subjected to 100% relative humidity and 77° F. for at least seven days.

19. The adhesive according to claim 18 further comprising at least one aqueous polyurethane polymer dispersion (C) comprising:
   i) at least one polymeric polyol component having at least one carboxylic acid group neutralized with a counter cation selected from the group consisting of quaternary ammonium hydroxide, tetramethyl ammonium hydroxide, ammonium hydroxide, sodium hydroxide and organic amines;
   ii) at least one polymeric polyol selected from the group consisting of polyester polyol, polyether polyol, polyesterether polyol, and mixtures thereof; and
   iii) at least one polyisocyanate.

20. A water-based laminating adhesive comprising:
   a) a first component comprising at least one aqueous vinyl polymer dispersion (A) comprising the reaction product of:
      i) at least one ethylenically unsaturated monomer;
      ii) at least one free radical initiator; and
      iii) optionally, at least one ethylenically unsaturated oligomer; and
   b) a second component comprising at least one water dispersible polyfunctional aziridine crosslinking agent (B), wherein the water dispersible polyfunctional aziridine crosslinking agent is selected from the group consisting of trimethylolpropane-tris-($\beta$(N-aziridinyl) propionate; pentaerythritol-tris-($\beta$(N-aziridinyl) propionate); and 1-aziridinepropanoic acid, 2-methyl-, 2-ethyl-2-[[3-(2-methyl-1-azirdinyl)-1-oxopropoxy] methyl]-1,3-propanediyl ester.

21. The adhesive according to claim 20, further comprising at least one aqueous polyurethane polymer dispersion (C) comprising:
   i) at least one polymeric polyol component having at least one carboxylic acid group neutralized with a counter cation selected from the group consisting of quaternary ammonium hydroxide, tetramethylammonium hydroxide, ammonium hydroxide, sodium hydroxide and organic amines;
   ii) at least one polymeric polyol selected from the group consisting of polyester polyol, polyether polyol, polyesterether polyol, and mixtures thereof; and
   iii) at least one polyisocyanate.

* * * * *

UNITED STATES PATENT AND TRADEMARK OFFICE
CERTIFICATE OF CORRECTION

PATENT NO. : 6,248,815 B1
DATED : June 19, 2001
INVENTOR(S) : George A. Papsin, Thomas E. Rolando and Peter A. Voss It is certified that error appears in the above-identified patent and that said Letters Patent is hereby corrected as shown below:

<u>Column 16,</u>
Line 63, "preseot" should be -- present --.

<u>Column 17,</u>
Line 46, "catholically" should be -- ethylenically --.

Signed and Sealed this

Eleventh Day of March, 2003

JAMES E. ROGAN
*Director of the United States Patent and Trademark Office*